US012570371B2

(12) United States Patent
Laqua et al.

(10) Patent No.: US 12,570,371 B2
(45) Date of Patent: Mar. 10, 2026

(54) METHOD FOR DETERMINING A DRIVER STATE OF A MOTOR-ASSISTED VEHICLE; METHOD FOR TRAINING A MACHINE LEARNING SYSTEM; MOTOR-ASSISTED VEHICLE

(71) Applicant: Robert Bosch GmbH, Stuttgart (DE)

(72) Inventors: Annika Laqua, Ulm (DE); Jan Schnee, Weil Im Schoenbuch (DE); Jo Pletinckx, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 18/295,464

(22) Filed: Apr. 4, 2023

(65) Prior Publication Data

US 2023/0331341 A1 Oct. 19, 2023

(30) Foreign Application Priority Data

Apr. 19, 2022 (DE) ..................... 10 2022 203 816.9

(51) Int. Cl.
| *B62M 6/50* | (2010.01) |
| *B62J 50/22* | (2020.01) |
| *G01C 21/36* | (2006.01) |

(52) U.S. Cl.
CPC ................ *B62M 6/50* (2013.01); *B62J 50/22* (2020.02); *G01C 21/36* (2013.01)

(58) Field of Classification Search
CPC . B62M 6/50; B62J 50/22; B62J 45/41; G06N 3/08; G06N 3/09; G06N 5/01; G06N 7/01; G06N 20/00; G01C 21/36

USPC .......................................................... 701/22
See application file for complete search history.

(56) References Cited

U.S. PATENT DOCUMENTS

| 11,852,495 | B1 * | 12/2023 | Sanchez | G06Q 40/08 |
| 2016/0016626 | A1 * | 1/2016 | Thompson | A63B 24/0062 |
| | | | | 701/22 |
| 2019/0005412 | A1 * | 1/2019 | Matus | G07C 5/085 |
| 2019/0235499 | A1 * | 8/2019 | Kazemi | G01S 17/931 |
| 2019/0243364 | A1 * | 8/2019 | Cohen | G08B 21/182 |
| 2019/0389482 | A1 * | 12/2019 | Michalakis | B60W 50/085 |
| 2020/0247420 | A1 * | 8/2020 | Gunaratne | G06V 10/82 |
| 2021/0049623 | A1 * | 2/2021 | Luo | G06Q 50/40 |
| 2021/0053565 | A1 * | 2/2021 | Kim | B60W 30/182 |
| 2021/0138304 | A1 * | 5/2021 | Mason | A63B 24/0075 |
| 2021/0339759 | A1 * | 11/2021 | Fouad | B60W 50/14 |
| 2022/0126878 | A1 * | 4/2022 | Moustafa | B60W 50/16 |
| 2022/0161890 | A1 * | 5/2022 | Earle | B62J 45/40 |
| 2022/0204126 | A1 * | 6/2022 | Shahana | B62M 6/45 |

(Continued)

FOREIGN PATENT DOCUMENTS

| DE | 10 2014 206 818 A1 | 10/2015 |
| DE | 10 2015 110 814 A1 | 1/2016 |

(Continued)

*Primary Examiner* — Andrew R Dyer
(74) *Attorney, Agent, or Firm* — Maginot, Moore & Beck LLP

(57) ABSTRACT

A method for determining a driver state of a motor-assisted vehicle, in particular an electric bicycle, includes providing a vehicle performance characteristic, a handling characteristic, and a driver performance characteristic. The method further includes determining the driver state using the vehicle performance characteristic, the handling characteristic, and the driver performance characteristic.

12 Claims, 2 Drawing Sheets

(56) References Cited

U.S. PATENT DOCUMENTS

| 2022/0242401 A1* | 8/2022 | Thompson | G06F 1/14 |
| 2022/0242441 A1* | 8/2022 | Thompson | G06V 10/774 |
| 2022/0266946 A1 | 8/2022 | Hancock et al. | |
| 2022/0270488 A1* | 8/2022 | Tang | G06N 3/084 |
| 2024/0028976 A1* | 1/2024 | Imoto | G06N 5/01 |
| 2024/0127042 A1* | 4/2024 | Ishikawa | G06N 3/08 |
| 2024/0144153 A1* | 5/2024 | Dohrn | G06Q 30/018 |
| 2024/0350850 A1* | 10/2024 | Gelenitis | G06N 20/00 |

FOREIGN PATENT DOCUMENTS

| DE | 10 2019 113 348 A1 | 1/2020 |
| DE | 10 2020 117 966 A1 | 1/2021 |
| EP | 3 531 071 A1 | 8/2019 |
| WO | 2021/186315 A1 | 9/2021 |

\* cited by examiner

METHOD FOR DETERMINING A DRIVER STATE OF A MOTOR-ASSISTED VEHICLE; METHOD FOR TRAINING A MACHINE LEARNING SYSTEM; MOTOR-ASSISTED VEHICLE

This application claims priority under 35 U.S.C. § 119 to patent application no. 10 2022 203 816.9, filed on Apr. 19, 2022 in Germany, the disclosure of which is incorporated herein by reference in its entirety.

BACKGROUND

EP 3 531 071 A1 describes a method for assisting a common driving experience of drivers of a plurality of mobile units.

SUMMARY

The disclosure relates to a method for determining a driver state of a motor-assisted vehicle, in particular an electric bicycle, wherein a vehicle performance characteristic, a handling characteristic, and a driver performance characteristic are provided to determine the driver state. Advantageously, the determined driver state can be used to improve the driver's driving experience.

In this context, a driver state is to be understood in particular to mean an estimate of the driving experience perceived by the driver of the motor-assisted vehicle. The driving experience may be directed to a single or multiple aspects, which may include, for example, a comfort, a perceived exertion, a driving pleasure, a sense of safety, or the like. The vehicle performance characteristic, the handling characteristic, and the driver performance characteristic are preferably sensor data that are suitable for quantifying the driver state. Alternatively, it is also conceivable that only one or two of the characteristics are provided and/or additional characteristics are provided to determine the driver state.

In the context of this application, a motor-assisted vehicle should, in particular, be understood to mean a vehicle that can be driven with a motor drive, in particular an electric motor drive, in addition to the muscle force of a driver. For example, the motor-assisted vehicle may be configured as an e-scooter or as an electric bicycle.

In the context of this application, an electric bicycle should in particular be understood as a bicycle that has a drive unit for assisting the driver. The electric bicycle is preferably configured as an e-bike, a pedelec, a cargo bicycle, a folding bicycle, or the like. The drive unit comprises a motor, which can be configured as a mid-drive motor, for example, or as a hub motor. The motor is preferably configured as an electric motor. The drive unit is connected to an energy storage unit for supplying power to the drive unit. The power supply unit is preferably configured as a battery pack and comprises a battery housing, which is preferably releasably connected to a frame of the bicycle. The electric bicycle comprises electronics that comprise a control unit for controlling or regulating the electric bicycle. The electronics preferably comprise a sensor unit, wherein the sensor unit may comprise, for example, motion sensors, torque sensors, speed sensors, a GNSS receiver, magnetic sensors, or the like. In addition, the electronics comprise a communication interface for wirelessly connecting the electric bicycle to an external device, such as a smartphone and/or a server.

Moreover, it is proposed that an environmental characteristic is additionally provided to determine the driver state. Advantageously, this can be used to improve the determination of the driver state. The environmental characteristic may be configured as a route-specific characteristic and/or as a weather-specific characteristic. It is also conceivable that the environmental characteristic is formed as an energy storage characteristic, such as a charging state of the battery pack. For example, the route-specific characteristic may be configured as information relating to the type of ground, a slope of a route section, a difficulty of a route section, a length of a route section, or the like. Advantageously, the environmental characteristic combines all characteristic that impact the driver-vehicle interface from the outside.

It is furthermore proposed that the vehicle performance characteristic, the handling characteristic, the driver performance characteristic and/or the environmental characteristic are sensed by a sensor unit of the vehicle and/or a sensor unit of an external device. Advantageously, precise detection of the respective characteristics can thereby be ensured. The external device is, in particular, a device configured for releasable mechanical connection to the vehicle and/or for wireless communication with the vehicle. For example, the external device may be configured as a smartphone or as a smart watch.

It is also proposed that the vehicle performance characteristic be configured as a motor-specific characteristic, in particular a motor power, an average motor power, a motor power range, a motor assistance characteristic, and/or a maximum motor power. The vehicle performance characteristic advantageously combines the force, the dynamics, and the response speed of the motor assistance.

Moreover, it is proposed that the handling characteristic should be configured as a standard deviation of a driver cadence, a standard deviation of the motor power, a lateral dynamics characteristic, in particular a lateral acceleration of the vehicle, a steering angle characteristic, and/or as a longitudinal dynamics characteristic, in particular a speed characteristic or an acceleration characteristic. Advantageously, the handling characteristic relates to the controllability and sensitivity of the motor assistance. The handling characteristic is, in particular, configured such that a consistency of the trip can be determined via the handling characteristic. For example, the steering angle characteristic may be configured as a steering angular speed, a steering angle, or a rotation rate.

Furthermore, it is proposed that the driver performance characteristic should be formed as a driver-specific characteristic, in particular as an integrated driver performance, a driver cadence, a physical condition of the driver, and/or a driver torque. Advantageously, the driver performance characteristic relates to a perceived exertion of the driver. The physical condition of the driver may, for example, be a heart rate, oxygen saturation of the blood, or the like.

In addition, the disclosure relates to a method for training a machine learning system, in particular a supervised machine learning system, wherein vehicle performance characteristics, handling characteristics and driver performance characteristics that are labeled with a subjective driver state characteristic are provided to the machine learning system.

Advantageously, the determination of the driver state can be improved by the machine learning system.

In connection with this application, a machine learning system should in particular be understood as algorithms that build a statistical model using training data. For example, parameters and attributes that go beyond the scope of the training data can be determined using the statistical model. The algorithms of the machine learning system may be algorithms for supervised learning, unsupervised learning, or reinforcement learning. For example, the machine learning system may be configured as a neural network. In contrast to the vehicle performance characteristic, the handling characteristic and the driver performance characteristic, the subjective driver state characteristic in particular cannot be determined or cannot be determined directly by means of data acquired by sensors. Alternatively or additionally, it is conceivable that objective driver state characteristics may be sensed by a sensor unit and preferably provided to the machine learning system. As an example, it is conceivable that the face of the driver is tracked via an external device, in particular via a smartphone, and is used to determine the emotional state. Thus, a laughing or relaxed face could be associated with a positive emotional state and thus a driver state.

The training data, in particular the vehicle performance characteristic, the handling characteristic, the driver performance characteristic, and the subjective driver state characteristic, are preferably captured by the motor-assisted vehicle and provided for training the machine learning system. However, it is also conceivable that the training data are partially or entirely captured and/or provided by an external device. For example, the subjective driver state characteristic may be configured as a comfort, a perceived exertion, a driving pleasure, a sense of safety of the driver, etc. For example, the labeling of the training data may take place locally, in particular on the vehicle, or on a server, in particular a web or cloud server. Training of the machine learning system preferably takes place on a or the server. Additionally, it is conceivable that the training of the machine learning system also takes place locally on the vehicle or external device, and the plurality of trained machine learning systems are then merged in the server. In the context of this application, the trained machine learning system corresponds to a model configured to determine the driver state. The model can be stored in a memory unit of a computer, electronics, or the like and can be used to determine the driver state.

Moreover, it is proposed that the machine learning system is configured to perform a classification method, in particular by means of a logistic regression, a decision tree, a KNN approach, or a Naive Bayes classification. Furthermore, it is suggested that the machine learning system is configured to perform a regression method, particularly by means of a linear regression, a decision tree, a Gaussian curve regression, or a KNN approach. Advantageously, by selecting the classification or regression method, the training can be optimally adjusted to the subjective driver state characteristic and/or the respective use case.

The machine learning system may also be configured as a neural network, in particular a neural network configured to process time series, such as an RNN neural network, an LSTM neural network, or a TCN neural network.

It is also proposed that the subjective driver characteristic be provided by means of an input of a driver. For example, the input of the driver may take place via an input element of the vehicle or an input element of the external device that is connected to the vehicle for data exchange. For example, the vehicle comprises an on-board computer and/or an HMI (human-machine interface). For example, it is conceivable that the subjective driver state characteristic is determined or queried at the end of a trip or at different points in time during a trip. It is also conceivable that multiple subjective driver state characteristics are queried per trip or per route section. For example, it may be conceivable that the driver-traveled route is divided into route section by the control unit, wherein the division takes place based on the slope in the respective route sections and the driver is asked at the end of each of the route sections for a first subjective driver state characteristic in the form of a perceived exertion. The query is performed, for example, via the on-board computer of the vehicle. At the end of the trip, the on-board computer may query further subjective driver state characteristics for the entire trip, such as driving pleasure, in addition to the perceived exertion of the last route section.

Moreover, the disclosure relates to a motor-assisted vehicle, in particular to an electric bicycle, comprising a control unit for controlling or regulating the vehicle, wherein the control unit is configured to perform a method for determining the driver state as previously described, and comprising a display unit for displaying information. In particular, the display unit is configured to display information based on the driver state. The information can be formed as an estimate of the current driver state, for example high driving pleasure. Alternatively or additionally, the information may also be configured to suggest an improvement to the driver state and to adjust, based on a driver input, the control unit of the vehicle to improve the driver state, for example, to drive the drive unit of the vehicle.

It is furthermore proposed that the driver state is provided to a navigation unit for determining a route. The navigation unit may be associated with the vehicle and/or the external device. The navigation unit is configured to process and/or determine route information. For displaying the route information, the navigation unit can be connected to the display unit of the vehicle.

BRIEF DESCRIPTION OF THE DRAWINGS

Further advantages will become apparent from the following description of the drawings. The drawings, the description and the disclosure contain numerous features in combination. The person skilled in the art will expediently also consider the features individually and combine them to form further meaningful combinations.

Shown are.

DETAILED DESCRIPTION

Figure 1:
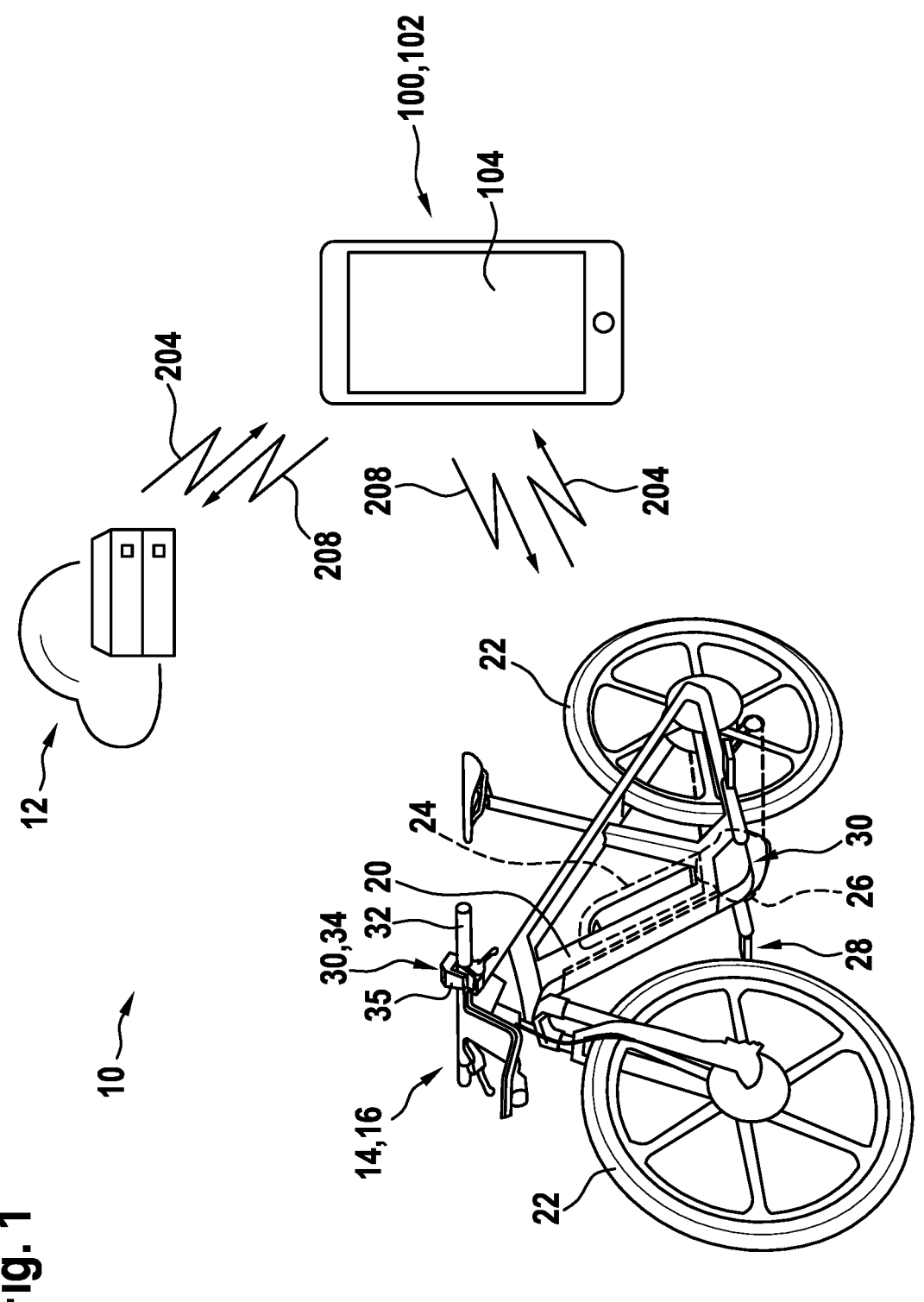
FIG. 1 a schematic view of a system for capturing training data for a machine learning system.

A system 10 for providing training data is schematically shown in FIG. 1.

The system 10 comprises a server 12 in the form of a web server and a motor-assisted vehicle 14. The motor-assisted vehicle 14 is, by way of example, configured as an electric bicycle 16. The electric bicycle 16 may be configured as a pedelec or an e-bike, for example.

The electric bicycle 16 comprises a housing in the form of a frame 20 or a bicycle frame. Two wheels 22 are connected to the frame 20. In addition, the electric bicycle 16 comprises an energy storage unit 24 in the form of a battery pack. In addition, the electric bicycle 16 comprises a drive unit 26, which comprises an electric motor and/or an auxiliary motor. The electric motor is preferably configured as a permanent magnet-excited, brushless DC motor. The electric motor is, by way of example, configured as a mid-drive motor, wherein a hub motor or the like is also conceivable. The electric bicycle 16, in particular the drive unit 26 of the electric bicycle 16, is powered via the energy storage unit 24. The energy storage unit 24 can be externally mountable to the frame 20 or can be integrated in the frame 20.

The drive unit 26 comprises a control unit (not shown) configured to control or regulate the electric bicycle 16, in particular the electric motor. The electric bicycle 16 comprises a pedal crank 28. The pedal crank 28 comprises a pedal crankshaft (not shown). The control unit of the electric bicycle 16 is connected to a sensor unit (not shown). The sensor unit of the electric bicycle 16 comprises, by way of example, multiple sensor elements, such as a torque sensor and a magnetic sensor.

The control unit and the drive unit 26 comprising the electric motor and the pedal crankshaft are arranged within a drive housing connected to the frame 20. The drive motion of the electric motor is preferably transmitted to the pedal crankshaft via a transmission (not shown), with the magnitude of the assistance by the drive unit 26 being controlled or regulated via the control unit. The control unit is configured to drive the drive unit 26 such that the driver of the electric bicycle 16 is assisted in pedaling. Preferably, the control unit can be operated by the driver so that the driver can set the assistance level.

The control unit and the sensor unit are associated with electronics (not shown) of the electric bicycle 16. The electronics comprise, by way of example, a printed circuit board on which a computing unit in the form of a CPU, a memory unit and the sensor unit are arranged. The electronics are, by way of example, arranged entirely in the drive housing of the drive unit 26. However, it is also conceivable that the electronics are only partially arranged in the drive housing and that components of the electronics are arranged at other areas of the electric bicycle 16. In addition, an arrangement of the electronics outside the drive housing is also conceivable.

The electric bicycle 16 also comprises, by way of example, an on-board computer 30 arranged on a handlebar 32 of the electric bicycle 16. The on-board computer 30 is partially releasably formed with the electric bicycle 16. The on-board computer 30 comprises a display unit 34 configured to display information. The on-board computer 30 also comprises an operating element via which the user or the driver can control the on-board computer 30 and/or the electric bicycle 16. The operating element is, by way of example, configured as a touch-sensitive screen, but it is also conceivable that the operating element is formed from knobs or buttons. The on-board computer 30 is connected to the control unit of the electric bicycle 16 such that information can be exchanged. For example, the display unit 34 can display a speed determined by the control unit, a set assistance level of the electric motor, route information of a navigation unit, and a state of charge of the energy storage unit 24.

The connection between the on-board computer 30 and the electronics of the electric bicycle 16 can take place via a wireless communication interface (not shown) of the electric bicycle 16 or in a wired manner. The wireless communication interface of the electric bicycle 16 is, by way of example, configured as a short-range communication interface in the form of a BLE (Bluetooth® Low Energy) interface. Alternatively, other short-range communication interfaces are also conceivable. Alternatively or additionally, it is also conceivable that the electric bicycle 16 has a long-range communication interface configured to connect the electric bicycle 16 to a server, for example a web server.

The system optionally comprises an external device 100 in the form of a smartphone 102. The external device 100 comprises a wireless communication interface configured to connect the external device 100 to the electric bicycle 16 and to the server 12. The wireless communication interface of the external device 100 comprises, by way of example, a BLE interface for connection to the electric bicycle 16 and an LTE interface for connection to the server 12. The electric bicycle 16 can thus exchange data with the server 12 via the external device 100. In the case of an electric bicycle 16 with a long-range communication interface, direct exchange of data between the electric bicycle 16 and the server 12 would also be possible.

Figure 2:
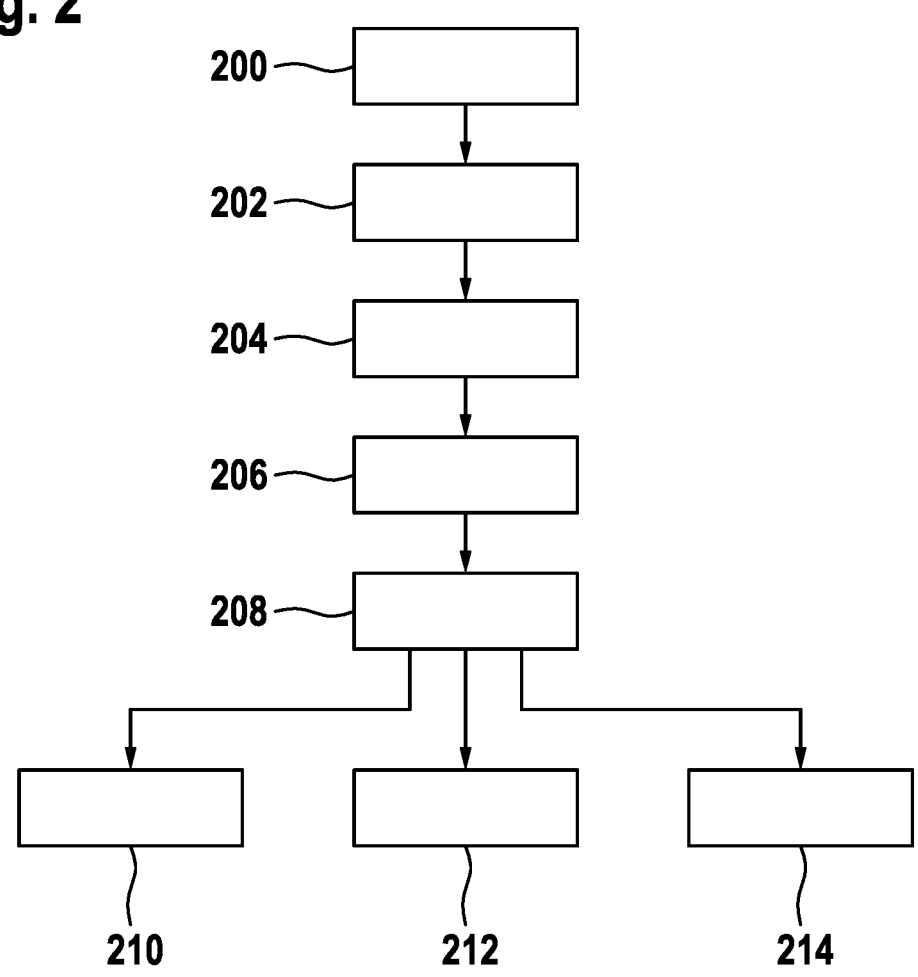
FIG. 2 a flow chart with a first method for training a machine learning system.

In FIG. 2, a flow chart is shown with an exemplary method for training a machine learning system, in particular a supervised machine learning system.

In a first step 200, the driver takes a trip on the electric bicycle 16. During the trip, at least one vehicle performance characteristic, at least one handling characteristic and at least one driver performance characteristics are recorded by the electronics and/or the control unit of the electric bicycle 16. The vehicle performance characteristic is, by way of example, formed as an average motor performance $\overline{pw}_m$. The handling characteristic is, by way of example, configured as a standard deviation of the cadence $\sigma(cad_r)$ and a standard deviation of the motor power $\sigma(pw_m)$. The driver performance characteristic is, by way of example, configured as an integrated driver performance $\int pw_r dt$.

In a second step 202, a subjective driver state characteristic is captured by means of which the vehicle performance characteristic, the handling characteristic and the driver performance characteristic are labeled. The subjective driver state characteristic is, by way of example, formed as a physical activity and as a well-being. By way of example, these variables are recorded by means of a query by the display unit 34 of the electric bicycle 16. For example, the display unit may display a question regarding physical activity, such as "Please rate how strenuous you found this trip." By means of an actuation of the on-board computer 30, an evaluation takes place by the driver, by means of which the subjective driver state characteristic is recorded.

The subjective driver state characteristic is preferably recorded at the end of the trip. The end of the trip may be determined, for example, via the destination of the navigation unit being reached or by the electric bicycle 16 determining a stop of the electric bicycle 16. Alternatively, it is also conceivable that during the trip, the labeling of the training data for selected route sections takes place.

The labeled vehicle performance characteristic, handling characteristic and driver performance characteristic or the labeled training data are provided to the server 12 in a further step 204 via the external device 100 connected to the electric bicycle 16.

A plurality of training data of the electric bicycle 16 and other electric bicycles are provided to the server 12. By means of the training data of the server 12, a machine learning system is trained in a step 206 to determine a driver state.

For example, the machine learning system may be configured to perform a regression method. The regression method may, by way of example, be configured as a linear regression, wherein the subjective driver state characteristic is determined as follows:

$$rpi\_lin = \beta 0 + \beta 1 * Driving\_Performance\_Characteristic - \beta 2 * Handling\_Characteristic - \beta 3 * Driver\_Performance\_Characteristic$$

or $$rpi\_lin = \beta 0 + \beta 1 * \overline{pw_m} - \beta 2 * \sigma(cad_r) - \beta 3 * \int pw_r dt$$

Alternatively, it is also conceivable that the machine learning system is configured, for example, to perform a classification method and that an additionally provided environmental characteristic in the form of a route type is optionally provided. The classification method may, by way of example, be configured as a logistic regression, wherein the subjective driver state characteristic is determined as follows:

$$P(rpi\_log=1) = 1/1 + e - (\beta 0 + \beta 1 * Performance - \beta 2 * Handling - \beta 3 * Physical\_Activity + \beta 4 * Environment))$$

The model created by the trained machine learning system is provided to the electric bicycle 16, in particular the control unit of the electric bicycle 16, in a further step 208. By applying the model, the control unit is configured to determine a driver state based on vehicle performance characteristics, handling characteristics, and driver performance characteristics recorded by the electric bicycle 16.

For example, the driver state may be displayed to the driver in a step 210 as information about the display unit 34 of the electric bicycle 16. It is also conceivable that the electric bicycle 16 determines, in a step 212, whether the driver state is optimized or can be improved by adjusting a driving performance characteristic or another characteristic. This information can also be displayed via the display unit 34 or can also be used for automatic or semi-automatic adjustment of the electric bicycle 16, for example by adjusting the motor assistance level. It is also conceivable that the driver state is used in a step 214 to determine optimal route information.

Figure 3:
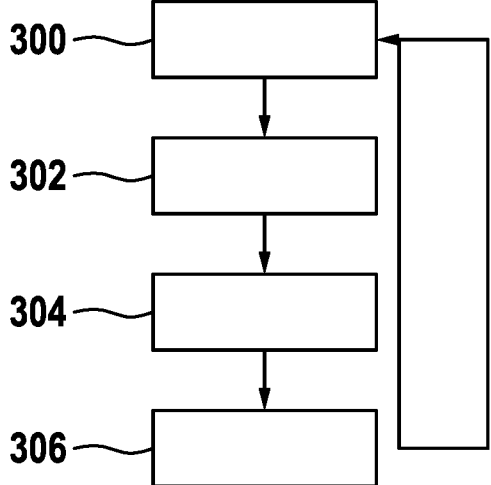
FIG. 3 a flow chart with a second method for training a machine learning system.

In FIG. 3, a flow chart with an alternative method for training the machine learning system is shown, wherein the determination of the coefficients takes place through a three-part, iterative approach.

In a first step 300, base coefficients are determined by means of a basic data set and a basic model is stored on the electronics or the electronics of the electric bicycle 16.

In a second step 302, the base model is converted through driver feedback into a local learning model. The driver feedback is provided, by way of example, as described above, by displaying and actuating the on-board computer 30 and thus corresponds to the recording of subjective driver state characteristics. They are respectively recorded after the trips or the respective trip segments. Based on the recorded subjective driver state characteristics, the coefficients of the model are continuously optimized for the particular driver. For recording the subjective driver state characteristics, the driver responds, by way of example, to questions regarding physical activity and well-being. Preferably, the subjective driver state characteristics may also include information regarding personal skills, such as a driving ability, a fitness level, preferences, a desired training intensity, or a driving style, and account for them by using weighting factors.

In a third step 304, the locally collected data are provided to the server 12 and thus globally combined training data of other electric bicycles or drivers in order to subsequently determine an optimized base model therefrom.

The optimized base model is again provided to the electric bicycle 16 in a step 306, where it can again be optimized locally for individualization as described in step 302.

The method described may also be used to transfer existing models to other use cases.

What is claimed is:

1. A computer-implemented method for operating an electric bicycle, comprising:
   obtaining, with a control unit of the electric bicycle, a vehicle performance characteristic;
   obtaining, with a control unit of the electric bicycle, a handling characteristic;
   obtaining, with a control unit of the electric bicycle, a driver performance characteristic;
   determining a driver state of a driver of the electric bicycle with a machine learning model using the obtained vehicle performance characteristic, the obtained handling characteristic, and the obtained driver performance characteristic, wherein the machine learning model has been trained with training data including a plurality of labeled training datasets, each respective training dataset of the plurality of labeled training datasets including at least one training vehicle performance characteristic, at least one training handling characteristic, and at least one training driver performance characteristic, and each respective training dataset is labeled with a subjective driver state characteristic queried of the training dataset driver for the ride on which the respective training dataset was recorded; and
   adjusting a motor assistance level of a motor of the electric bicycle based on the determined driver state, wherein the motor provides supplemental drive assistance to muscle force of the driver.

2. The method according to claim 1, further comprising:
   obtaining an environmental characteristic,
   wherein each respective training dataset further includes at least one labeled environmental characteristic, and
   the determining of the driver state further comprises determining the driver state with the machine learning model using the obtained environmental characteristic.

3. The method according to claim 2, wherein at least one of the obtained vehicle performance characteristic, the obtained handling characteristic, the obtained driver performance characteristic, and the obtained environmental characteristic is sensed using at least one of a sensor unit of the vehicle and a sensor unit of an external device.

4. The method according to claim 2, wherein the environmental characteristic includes at least one of a route-specific characteristic and a weather-specific characteristic.

5. The method according to claim 1, wherein the vehicle performance characteristic is a motor-specific characteristic of the motor of the electric bicycle.

6. The method according to claim 5, wherein the motor-specific characteristic includes at least one of a current motor power, an average motor power, a motor power range, a motor assistance characteristic, and a maximum motor power.

7. The method according to claim 1, wherein the handling characteristic includes at least one of a standard deviation of a driver cadence, a standard deviation of motor power of the motor of the electric bicycle, a lateral acceleration of the electric bicycle, a steering angle characteristic of the electric bicycle, a speed characteristic of the electric bicycle, and an acceleration characteristic of the electric bicycle.

8. The method according to claim 1, wherein the driver performance characteristic includes at least one of an integrated driver performance, a driver cadence, and a driver torque.

9. The method according to claim 1, wherein at least one of the handling characteristic and the driver performance characteristic is based on a driver cadence.

10. An electric bicycle, comprising:

a pedal crank configured to receive muscle force from a driver for driving the electric bicycle;

a motor that provides supplemental drive assistance to the muscle force of the driver;

a display unit configured to display information; and a control unit configured to control or regulate the electric bicycle, wherein the control unit is configured to obtain a vehicle performance characteristic, obtain a handling characteristic, obtain a driver performance characteristic, determine a driver state of the driver with a machine learning model using the vehicle performance characteristic, the handling characteristic, and the driver performance characteristic, wherein the machine learning model has been trained with training data including a plurality of labeled training datasets, each respective training dataset of the plurality of labeled training datasets including at least one training vehicle performance characteristic, at least one training handling characteristic, and at least one training driver performance characteristic, and each respective training dataset is labeled with a subjective driver state characteristic queried of the training dataset driver for the ride on which the respective training dataset was recorded, and adjust a motor assistance level of the motor based on the determined driver state.

11. The electric bicycle according to claim 10, wherein the display unit is configured to display information based on the determined driver state.

12. The electric bicycle according to claim 10, further comprising:

a navigation unit configured to determine a route for the electric bicycle using the determined driver state.

* * * * *